US012312837B1

(12) United States Patent
Chen et al.

(10) Patent No.: US 12,312,837 B1
(45) Date of Patent: May 27, 2025

(54) LOCK WITH MULTIPLE SWITCHABLE OPERATING MODES

(71) Applicant: ZHONGSHAN META INTELLIGENCE TECHNOLOGY CO., LTD., Guangdong (CN)

(72) Inventors: Jian Chen, Guangdong (CN); Xifeng Wang, Guangdong (CN); Jun Li, Guangdong (CN)

(73) Assignee: ZHONGSHAN META INTELLIGENCE TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/567,580

(22) PCT Filed: Sep. 20, 2023

(86) PCT No.: PCT/CN2023/120080
§ 371 (c)(1),
(2) Date: Dec. 11, 2023

(87) PCT Pub. No.: WO2024/230041
PCT Pub. Date: Nov. 14, 2024

(30) Foreign Application Priority Data

May 9, 2023 (CN) ........................ 202310521315.X

(51) Int. Cl.
*E05B 63/00* (2006.01)
*E05B 17/14* (2006.01)
(Continued)

(52) U.S. Cl.
CPC ........ *E05B 63/0065* (2013.01); *E05B 17/142* (2013.01); *E05B 45/06* (2013.01);
(Continued)

(58) Field of Classification Search
CPC .... E05B 63/00; E05B 63/0065; E05B 17/142; E05B 45/06; E05B 47/0012;
(Continued)

(56) References Cited

U.S. PATENT DOCUMENTS 4,438,962 A * 3/1984 Soloviff .............. E05B 47/0012 292/144
6,297,725 B1 * 10/2001 Tischendorf .......... E05B 47/068 70/478
(Continued)

FOREIGN PATENT DOCUMENTS

CN 212249566 U 12/2020
CN 113236044 A 8/2021
(Continued)

OTHER PUBLICATIONS

ISA/CN; International Search Report and Written Opinion for International Patent Application No. PCT/CN2023/120080, mailed Nov. 23, 2023, 13 pages.
(Continued)

*Primary Examiner* — Suzanne L Barrett
(74) *Attorney, Agent, or Firm* — NK Patent Law

(57) ABSTRACT

A lock with multiple switchable operating modes has a first operating mode and a second operating mode. In the first operating mode, a moving member can trigger a first switch member, so that a control module can control the electric clutch mechanism to work only when receiving specific identification information, thereby limiting a condition that the lock can be opened. In the second operating mode, the moving member can drive a blocking member to move so as to prevent a first clutch member and a driving member from being engaged, in this case, any identification information input cannot achieve electric unlocking, and a mechanical lock cylinder can only be unlocked using a key.

9 Claims, 5 Drawing Sheets

(51) Int. Cl.
*E05B 45/06* (2006.01)
*E05B 47/00* (2006.01)

(52) U.S. Cl.
CPC ...... *E05B 47/0012* (2013.01); *E05B 47/0038* (2013.01); *E05B 2045/065* (2013.01); *E05B 2047/0017* (2013.01); *E05B 2047/0026* (2013.01); *E05B 2047/0067* (2013.01); *E05B 2047/0084* (2013.01); *E05B 2047/0094* (2013.01)

(58) Field of Classification Search
CPC ........... E05B 47/0038; E05B 2045/065; E05B 2047/0017; E05B 2047/0026; E05B 2047/0067; E05B 2047/0084; E05B 2047/0094; Y10T 70/5819; Y10T 70/5823; Y10T 70/5827
USPC .......................................................... 70/279.1
See application file for complete search history.

(56) References Cited

U.S. PATENT DOCUMENTS

| | | | | |
|---|---|---|---|---|
| 7,061,197 | B1 | 6/2006 | Mullet et al. | |
| 2007/0051145 | A1 * | 3/2007 | Chang | E05B 13/108 70/279.1 |
| 2013/0167598 | A1 | 7/2013 | Huang | |
| 2019/0203504 | A1 | 7/2019 | Fauvel | |
| 2021/0222458 | A1 * | 7/2021 | Jones | E05B 47/068 |

FOREIGN PATENT DOCUMENTS

| | | | |
|---|---|---|---|
| CN | 114622774 | A | 6/2022 |
| CN | 217405309 | U | 9/2022 |
| CN | 115653406 | A | 1/2023 |
| CN | 116065890 | A | 5/2023 |
| CN | 219262018 | U | 6/2023 |
| JP | 2009068311 | A | 4/2009 |
| WO | 2019071306 | A1 | 4/2019 |

OTHER PUBLICATIONS

CNIPA; First Office Action for corresponding Chinese Patent Application No. 202310521315X, dated Nov. 1, 2023, 13 pages.

CNIPA; Search Report for corresponding Chinese Patent Application No. 202310521315X, dated Oct. 31, 2023, 5 pages.

* cited by examiner

LOCK WITH MULTIPLE SWITCHABLE OPERATING MODES

CROSS-REFERENCE TO RELATED APPLICATIONS

This application is a national stage filing under 35 U.S.C. § 371 of international application number PCT/CN2023/120080, filed Sep. 20, 2023, which claims priority to Chinese patent application No. 202310521315X filed May 9, 2023. The contents of these applications are incorporated herein by reference in their entirety.

TECHNICAL FIELD

The present disclosure relates to the technical field of locks, and in particular, to a lock with multiple switchable operating modes.

BACKGROUND

At present, a room door lock is usually unlocked by a key, and an electric unlocking mode also exists in the related technology. To meet the requirement that a user is not expected to be disturbed indoors, the room door lock either unlocked by the key or using the electric unlocking mode is provided with a knob member capable of back-locking, and the knob member implements the back-locking by driving a spring bolt to extend.

With the above back-locking structure, no one outside the door can open the door. When the user needs to achieve different degrees of privacy requirements, a lock with such structure cannot meet the needs of users in various usage scenarios due to a single operating mode of such back-locking.

SUMMARY

The present disclosure aims to at least solve one of the technical problems in the existing technology. Therefore, the present disclosure provides a lock with multiple switchable operating modes so as to meet different degrees of privacy requirements of the user, which can be used in various usage scenarios to expand the functions of the lock.

The lock with multiple switchable operating modes according to an embodiment of the present disclosure has a first operating mode and a second operating mode, and comprises: a front lock body; a rear lock body; a connecting rod, wherein one end of the connecting rod is connected to the rear lock body, and the other end of the connecting rod is fixedly connected to a driving member extending into the front lock body; an electric clutch mechanism arranged on the front lock body, wherein the electric clutch mechanism has a first clutch member that is capable of being engaged with or separated from the driving member; a mechanical lock cylinder arranged on the front lock body, wherein the mechanical lock cylinder has a second clutch member that is capable of being engaged with or separated from the driving member; an identification module arranged on the front lock body and electrically connected to the electric clutch mechanism; a first switch member arranged on the front lock body; a blocking member movably arranged on the front lock body; a first linkage mechanism, wherein the first linkage mechanism comprises an operating member arranged on the rear lock body, a moving member arranged on the front lock body, and a linkage member arranged between the operating member and the moving member, the moving member has a first operating position and a second operating position, the operating member is capable of driving the moving member to switch between the first operating position and the second operating position through the linkage member, the moving member located at the first operating position is capable of triggering the first switch member, so that the first switch member generates a trigger signal, and the moving member located at the second operating position is capable of driving the blocking member to move so as to prevent the first clutch member and the driving member from being engaged to enable the lock to be switched to the second operating mode; and a control module, wherein the control module is electrically connected to the identification module, the electric clutch mechanism and the first switch member, and controls the lock to be switched to the first operating mode according to the trigger signal.

The lock with multiple switchable operating modes according to an embodiment of the present disclosure at least has the following beneficial effects.

The lock with the above structure can be switched to a first operating mode or a second operating mode by using the first linkage mechanism. In the first operating mode, the moving member is capable of triggering the first switch member, so that the control module can control the electric clutch mechanism to work only when receiving specific identification information, thereby limiting a condition that the lock can be opened. In the second operating mode, the moving member is capable of driving the blocking member to move so as to prevent the first clutch member and the driving member from being engaged, in this case, any identification information input cannot achieve electric unlocking, and the mechanical lock cylinder can only be unlocked using a key. With the above structure, a user can adjust the lock to the first operating mode or the second operating mode according to the required privacy degree to meet the needs of different usage scenarios and expand the functions of the lock.

In some embodiments of the present disclosure, when the lock is in the first operating mode, the identification module is capable of triggering, by receiving an administrator password, the control module to drive the first clutch member and the driving member to be engaged; and when the lock is in the second operating mode, the second clutch member is capable of being engaged with the driving member only by inserting a key into the mechanical lock cylinder by a user.

In some embodiments of the present disclosure, a through hole is formed in the connecting rod and extends through the connecting rod along a length direction of the connecting rod, the linkage member is a rod member that extends through the through hole, the operating member is connected to one end of the rod member close to the rear lock body and protruding out of an outer surface of the rear lock body, the moving member is connected to one end of the rod member close to the front lock body and protruding out of the driving member, the moving member has a first eccentric portion that protrudes out along a side portion of the rod member, and the operating member is capable of driving the rod member and the moving member to rotate together around a first axis relative to the connecting rod, so that the first eccentric portion contacts the first switch member or the blocking member.

In some embodiments of the present disclosure, the blocking member is rotatably arranged on the front lock body through a first pivot, one end of the blocking member corresponds to the moving member, the other end of the blocking member is rotatable to abut against the first clutch member to prevent the first clutch member and the driving member from being engaged, the blocking member is connected to a first elastic member, and the first elastic member drives the blocking member away from the first clutch member to enable the first clutch member to be engaged with the driving member.

In some embodiments of the present disclosure, the rod member is a strip, the strip is freely rotatable in the through hole, the operating member is provided with a first slot for one end of the strip to be inserted, the other end of the strip is provided with a T-shaped anti-disengaging portion, the moving member is provided with a second slot matched with the T-shaped anti-disengaging portion, and a clamp for driving the T-shaped anti-disengaging portion to be tightly engaged with the second slot is arranged outside the moving member.

In some embodiments of the present disclosure, the mechanical lock cylinder comprises a lock sleeve and a core body rotatably arranged within the lock sleeve, the core body is linked with the first clutch member to extend out towards the driving member, an sensing part is arranged at a keyhole of the core body, the lock sleeve is movably provided with a pre-ejecting member arranged in parallel with an extending direction of the keyhole, the lock further comprises an alarm module, a voice identification module, and a linear driver configured to drive the pre-ejecting member to move in a telescopic way, the alarm module is configured to give an alarm when the sensing part detects a key being arranged in the keyhole, the voice identification module, the linear driver, the alarm module and the sensing part are all electrically connected to the control module, and the control module controls the telescopic movement of the linear driver and the operating state of the alarm module according to the voice information identified by the voice identification module.

In some embodiments of the present disclosure, a through hole is formed in the connecting rod and extends through the connecting rod along a length direction of the connecting rod, the linkage member is a rod member that extends through the through hole, one end of the rod member is connected to a pressing member, the other end of the rod member is connected to a push block, a pressing and positioning structure is provided between the pressing member and the rear lock body, the pressing and positioning structure comprises an elastic clamping block arranged on the pressing member, a guide rail is arranged in the rear lock body and is configured to allow the elastic clamping block to rotate, the guide rail is provided with a first positioning groove and a second positioning groove at an interval in a pressing direction of the pressing member, the first positioning groove has a first guide inclined surface for guiding the elastic clamping block to leave the first positioning groove to enter the second positioning groove, the second positioning groove has a second guide inclined surface for guiding the elastic clamping block to leave the second positioning groove to return to the guide rail, and a first side push inclined surface corresponding to the first switch member and a second side push inclined surface corresponding to the blocking member are arranged on two opposite sides of the push block.

In some embodiments of the present disclosure, the electric clutch mechanism comprises a motor fixedly arranged in the front lock body, a rotation block connected to an output shaft of the motor, and a moving block that is capable of reciprocating along an extending direction of the output shaft of the motor, the second clutch member is a second plug pin arranged on the moving block, the driving member is provided with a second plug hole corresponding to the second plug pin, a magnetic component is arranged between the rotation block and the moving block, and when the motor drives the rotation block to rotate, the magnetic component drives the moving block close to or away from the rotation block, so as to drive the second plug pin to insert into or separate from the second plug hole.

In some embodiments of the present disclosure, the front lock body is movably provided with a cover plate capable of closing the keyhole, the cover plate is coupled to the moving member through a second linkage mechanism, the lock further has a third operating mode, the moving member has a third operating position corresponding to the third operating mode, and the moving member in the third operating position is capable of driving the blocking member to move so as to prevent the first clutch member and the driving member from being engaged and is capable of driving the cover plate to keep closing the keyhole.

In some embodiments of the present disclosure, the cover plate is rotatably arranged on the front lock body through a second pivot, the second pivot is provided with a second elastic member, the second elastic member is configured to drive the cover plate to open the keyhole, the second pivot is provided with a side extension portion protruding out along a radial direction of the second pivot, the second linkage mechanism comprises a lever rotatably arranged inside the front lock body, one end of the lever corresponds to the moving member, and the other end of the lever is capable of pushing the side extension portion to rotate the second pivot, so as to drive the cover plate to keep closing the keyhole.

Additional aspects and advantages of the present disclosure will be set forth in part in the following description, some of which will be apparent from the following description, or will be learned by practice of the present disclosure.

BRIEF DESCRIPTION OF DRAWINGS

The above and/or additional aspects and advantages of the present disclosure will become apparent and readily appreciated from the following description of the embodiments with reference to the accompanying drawings. In the drawings.

DETAILED DESCRIPTION

Figure 1:
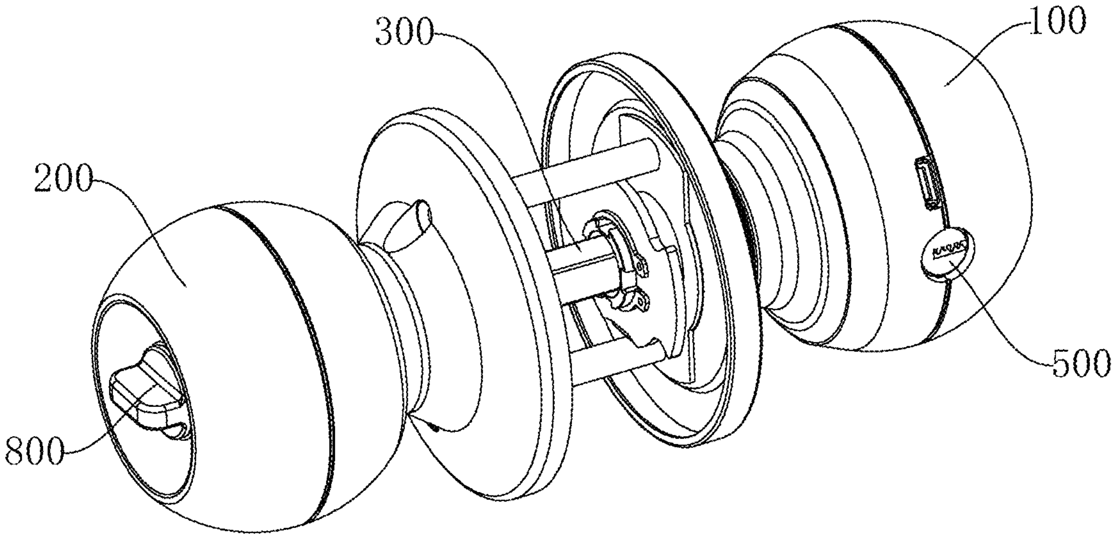
FIG. 1 is a structural schematic diagram of a lock with multiple switchable operating modes according to an embodiment of the present disclosure.

The specific embodiments of the present disclosure will be described in detail in this section, and the preferred embodiments of the present disclosure are illustrated in the drawings. The drawings are provided for the purpose of graphically supplementing the description in the text contents of the specification, such that every technical feature and the overall technical solutions of the present disclosure can be intuitively and vividly understood. However, the drawings shall not be construed as limiting the protection scope of the present disclosure.

In the description of the present disclosure, the description of “first”, “second”, “third”, “fourth”, “fifth” and the like is merely for the purpose of distinguishing technical features, but shall not be understood as an indication or implication of relative importance, or an implicit indication of a quantity of indicated technical features, or an implicit indication of the sequence of the indicated technical features.

In the description of the present disclosure, it should be understood that the directional descriptions, for example, directions or positional relationships indicated by terms such as “upper”, “lower”, “front”, “rear”, “left”, “right” and the like, are based on the accompanying drawings, which are merely intended to facilitate and simplify the description of the present disclosure rather than indicate or imply that the indicated apparatus or element must have a specific direction and must be configured and operated according to the specific direction. Therefore, these directions or positional relationships should not be construed as limiting the present disclosure.

In the description of the present disclosure, unless otherwise explicitly defined, terms such as “arrange”, “mount”, “connect” and the like should be understood in a broad sense. For example, the term “connect” may be a direct connection, may be an indirect connection implemented by using an intermediate medium; may be a fixed connection, may be a detachable connection, or may be integration; may be a mechanical connection; or may be communication inside two elements or an interaction relationship between two elements. Those having ordinary skills in the art can reasonably determine the specific meanings of the above terms in the present disclosure in conjunction with the specific contents of the technical solutions.

Referring to FIGS. 1 to 5, a lock with multiple switchable operating modes according to an embodiment of the present disclosure has a first operating mode and a second operating mode, and comprises: a front lock body 100; a rear lock body 200; a connecting rod 300, wherein one end of the connecting rod is connected to the rear lock body 200, and the other end of the connecting rod is fixedly connected to a driving member 310 extending into the front lock body 100; an electric clutch mechanism 400 arranged on the front lock body 100, wherein the electric clutch mechanism 400 has a first clutch member 410 that is capable of being engaged with or separated from the driving member 310; a mechanical lock cylinder 500 arranged on the front lock body 100, wherein the mechanical lock cylinder 500 has a second clutch member 600 that is capable of being engaged with or separated from the driving member 310; an identification module arranged on the front lock body 100 and electrically connected to the electric clutch mechanism 400; a first switch member 710 arranged on the front lock body 100; a blocking member 720 movably arranged on the front lock body 100; a first linkage mechanism 800, wherein the first linkage mechanism 800 comprises an operating member 810 arranged on the rear lock body 200, a moving member 820 arranged on the front lock body 100, and a linkage member 830 arranged between the operating member 810 and the moving member 820, the moving member 820 has a first operating position and a second operating position, the operating member 810 is capable of driving the moving member 820 to switch between the first operating position and the second operating position through the linkage member 830, the moving member 820 located at the first operating position is capable of triggering the first switch member 710, so that the first switch member 710 generates a trigger signal, and the moving member 820 located at the second operating position is capable of driving the blocking member 720 to move so as to prevent the first clutch member 410 and the driving member 310 from being engaged to enable the lock to be switched to the second operating mode; and a control module, wherein the control module is electrically connected to the identification module, the electric clutch mechanism 400 and the first switch member 710, and controls the lock to be switched to the first operating mode according to the trigger signal.

The lock with the above structure can be switched to a first operating mode or a second operating mode by using the first linkage mechanism 800. In the first operating mode, the moving member 820 is capable of triggering the first switch member 710, so that the control module can control the electric clutch mechanism 400 to work only when receiving specific identification information, thereby limiting a condition that the lock can be opened. In the second operating mode, the moving member 820 is capable of driving the blocking member 720 to move so as to prevent the first clutch member 410 and the driving member 310 from being engaged, in this case, entering any identification information cannot achieve electric unlocking, any identification information input cannot achieve electric unlocking, and the mechanical lock cylinder 500 can only be unlocked using a key. With the above structure, a user can adjust the lock to the first operating mode or the second operating mode according to the required privacy degree to meet the needs of different usage scenarios and expand the functions of the lock.

It may be understood that, specifically, when a user in a room is not expected to the disturbance of others outside the room other than a designated person, the lock is adjusted to the first operating mode. In this case, the others other than the designated person cannot start the electric clutch mechanism 400 even if inputting ordinary authentication information. However, the authentication information of the designated person can start the electric clutch mechanism 400 to unlock the lock. For example, when a child enters a room and drives the operating member 810, the operating member 810 drives the moving member 820 to move to the first operating position through the linkage member 830, in this case, the moving member 820 triggers the first switch member 710, the first switch member 710 generates a trigger signal, and the control module adjusts the authentication information that can be identified by the identification module according to the trigger signal, so that other people other than parents cannot unlock through the electric clutch mechanism 400. For another example, when one or more users enter a room and perform a related privacy action, to obtain a use function with a higher privacy degree, the user may drive the operating member 810 to move the moving member 820 to the second operating position. In this case, the moving member 820 is capable of driving the blocking member 720 to move to a position where the first clutch member 410 and the driving member 310 are prevented from being engaged, so that the electric clutch mechanism 400 fails, and a person located outside the room door can only open the mechanical lock cylinder 500 by using a key to unlock, which not only achieves a better privacy protection effect, but also retains the function of unlocking, thereby ensuring security.

In some embodiments of the present disclosure, when the lock is in the first operating mode, the identification module receives an administrator password and can trigger the control module to drive the first clutch member 410 and the driving member 310 to be engaged; and when the lock is in the second operating mode, a user can only insert a key into the mechanical lock cylinder 500 to engage the second clutch member 600 with the driving member 310. It should be noted that the administrator password may be at least one of a designated digital password, a fingerprint password, and face information. When the operating member 810 is in an initial position, the lock is in other operating modes other than the first operating mode and the second operating mode, in this case, the lock can be unlocked by any preset password information. In a case that the lock is in the first operating mode, if and only when the identification module receives the administrator password, the control module can control the electric clutch mechanism 400 to act so as to achieve electric unlocking, thereby achieving a certain degree of privacy guarantee. When the user requires a higher level of privacy guarantee, the user drives the first linkage mechanism 800 to move the blocking member 720 to prevent the first clutch member 410 and the driving member 310 from being engaged. In this case, even if the first clutch member 410 tends to move toward the driving member 310, the first clutch member 410 cannot be engaged with the driving member 310 under the blocking of the blocking member 720.

Figure 2:
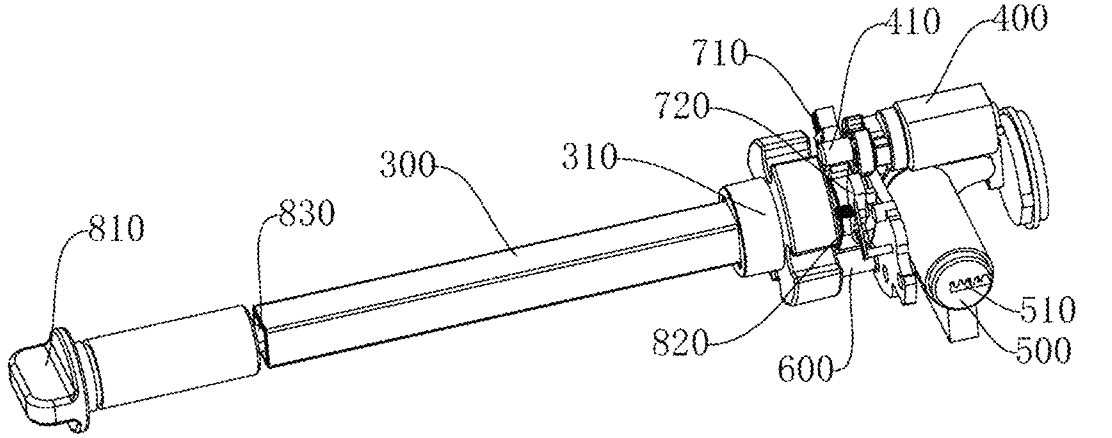
FIG. 2 is a structural schematic diagram of the lock shown in FIG. 1 with a part of a front lock body and a part of a rear lock body removed.
Figure 3:
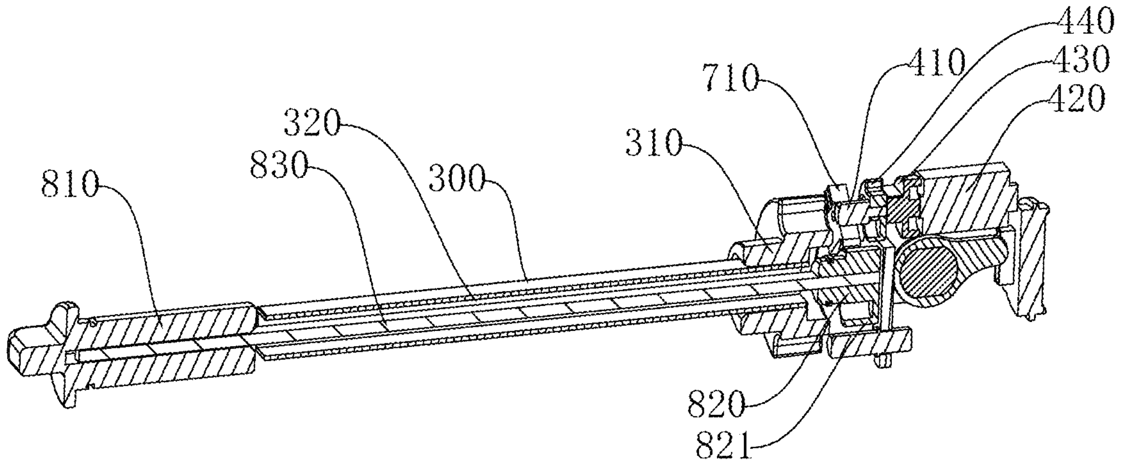
FIG. 3 is a schematic longitudinal section view of FIG. 2.
Figure 4:
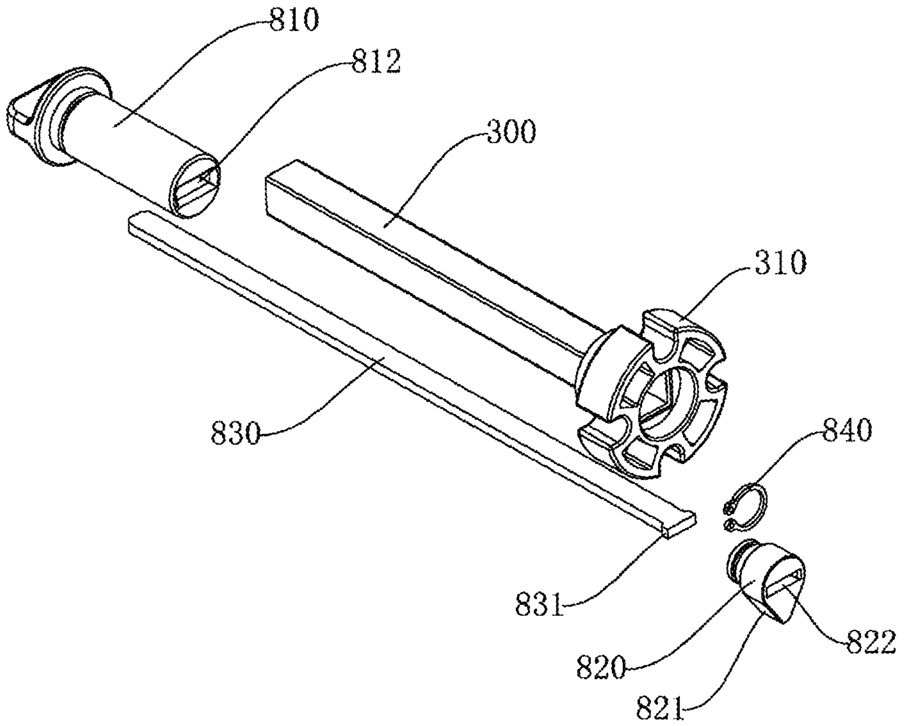
FIG. 4 is a structural schematic diagram showing a first linkage mechanism, a connecting rod and a driving member of FIG. 2 in a separated configuration.

Referring to FIGS. 2, 3, and 4, in some embodiments of the present disclosure, a through hole 320 is formed in the connecting rod 300 and extends through the connecting rod along a length direction of the connecting rod, the linkage member 830 is a rod member that extends through the through hole 320, the operating member 810 is connected to one end of the rod member close to the rear lock body 200 and protruding out of an outer surface of the rear lock body 200, the moving member 820 is connected to one end of the rod member close to the front lock body 100 and protruding out of the driving member 310, the moving member 820 has a first eccentric portion 821 that protrudes out along a side portion of the rod member, and the operating member 810 is capable of driving the rod member and the moving member 820 to rotate together around a first axis relative to the connecting rod 300, so that the first eccentric portion 821 can contact the first switch member 710 or the blocking member 720. It may be understood that the operating member 810 is a knob member. When the operating member 810 rotates, the rod member and the moving member 820 are driven to rotate together, and in this case, the first eccentric portion 821 on the moving member 820 is capable of triggering the first switch member 710 or is capable of driving the blocking member 720 to move to a position where the first clutch member 410 can be blocked from moving toward the driving member 310. In this embodiment, the first switch member 710 and the blocking member 720 are respectively located at two opposite sides of the moving member 820, and rotating the operating member 810 clockwise and rotating the operating member 810 counterclockwise correspond to the first operating position and the second operating position of the moving member 820, respectively. The first linkage mechanism 800 is simple in structure and operation, and compared with a conventional mode of implementing back-locking by using a spring bolt, the first linkage mechanism has more functions and more application scenarios. Moreover, it should be noted that the connecting rod 300 in the existing technology is a solid rod. However, the lock of the present disclosure is skillfully provided with a through hole 320 inside the connecting rod 300, the linkage member 830 extends through the through hole 320, and the first eccentric portion 821 of the moving member 820 is linked to rotate in a rotating manner to trigger the first switch member 710 or drive the blocking member 720 to prevent the first clutch member 410 and the driving member 310 from being engaged, so that this structure is highly compact and does not change a basic structure of the original lock, which has a positive influence on the manufacturing of lock.

Figure 5:
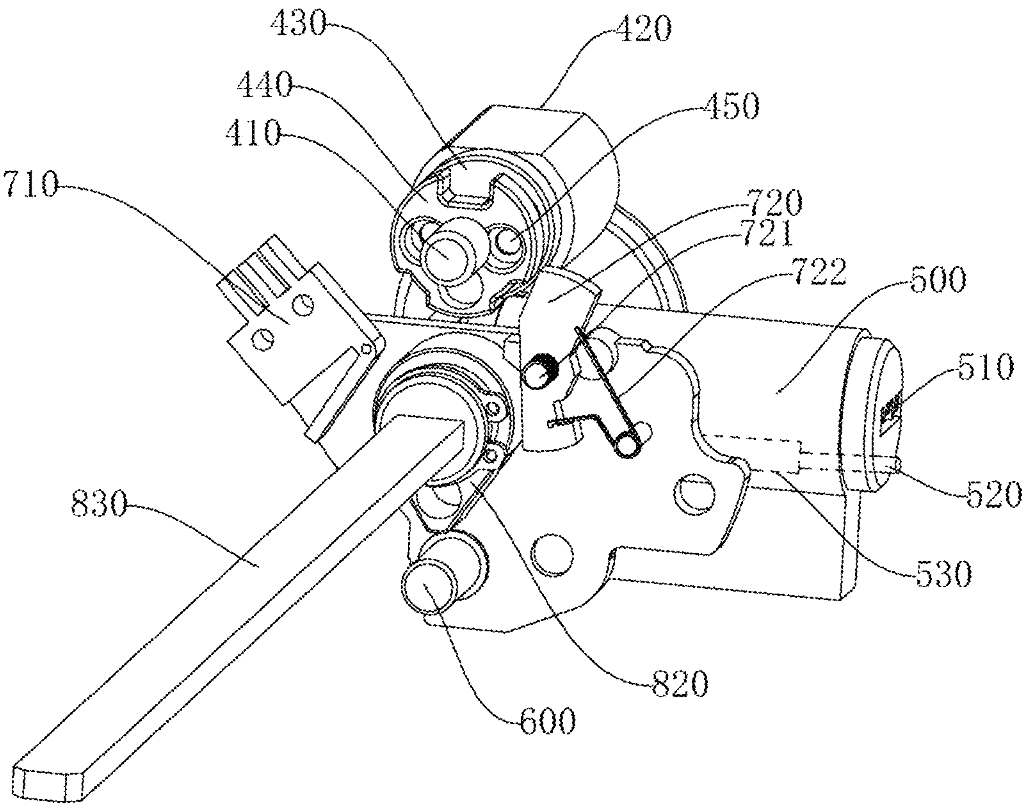
FIG. 5 is a structural schematic diagram showing interior of a front lock body according to an embodiment of the present disclosure.

Referring to FIG. 5, in some embodiments of the present disclosure, the blocking member 720 is rotatably arranged on the front lock body 100 through a first pivot 721, one end of the blocking member 720 corresponds to the moving member 820, the other end of the blocking member 720 can rotate to abut against the first clutch member 410 to prevent the first clutch member 410 and the driving member 310 from being engaged, the blocking member 720 is connected to a first elastic member 722, and the first elastic member 722 drives the blocking member 720 away from the first clutch member 410 to enable the first clutch member 410 to be engaged with the driving member 310. It should be noted that when the first eccentric portion 821 of the moving member 820 does not contact the blocking member 720, the blocking member 720 is far away from the first clutch member 410 under the action of the first elastic member 722 to avoid blocking the first clutch member 410 and the driving member 310 from being engaged, and when the moving member 820 rotates such that the first eccentric portion 821 drives the blocking member 720 to rotate around the first pivot 721, one end of the blocking member 720 far away from the first eccentric portion 821 rotates to prevent the first clutch member 410 from extending toward the driving member 310.

Figure 6:
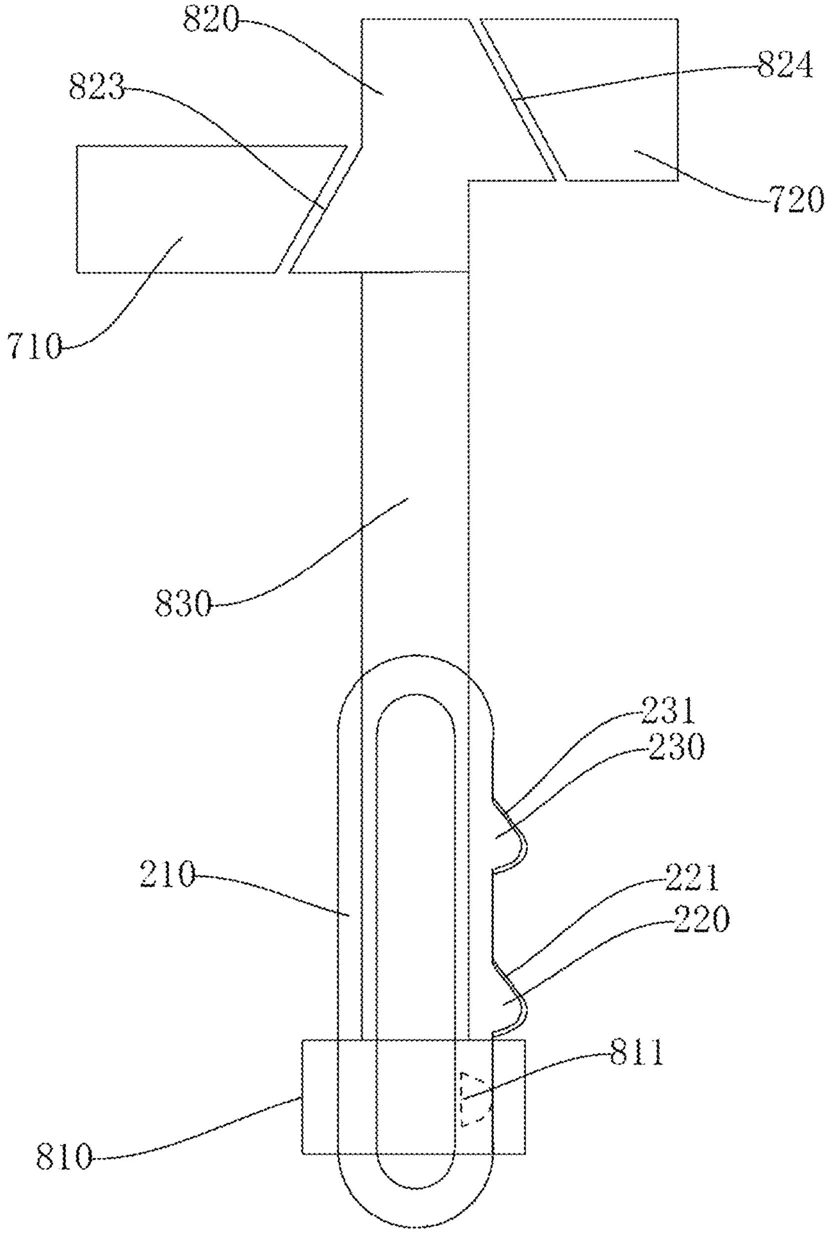
FIG. 6 is a schematic diagram of the first linkage mechanism according to another embodiment of the present disclosure.

It may be understood that the structure of the first linkage mechanism 800 is not limited to the above form, and the movement manner of the operating member 810, the linkage member 830 and the moving member 820 is not limited to rotation. Here, the applicant proposes another implementation for the first linkage mechanism 800. Referring to FIG. 6, the first linkage mechanism 800 comprises a rod member, wherein one end of the rod member is connected to the pressing member, the other end of the rod member is connected to the push block, and a pressing and positioning structure is provided between the pressing member and the rear lock body 200. Specifically, the pressing and positioning structure comprises an elastic clamping block 811 arranged on the pressing member, a guide rail 210 is arranged in the rear lock body 200 and is configured to allow the elastic clamping block 811 to rotate, the guide rail 210 is provided with a first positioning groove 220 and a second positioning groove 230 at an interval in a pressing direction of the pressing member, the first positioning groove 220 has a first guide inclined surface 221 for guiding the elastic clamping block 811 to leave the first positioning groove 220 to enter the second positioning groove 230, the second positioning groove 230 has a second guide inclined surface 231 for guiding the elastic clamping block 811 to leave the second positioning groove 230 to return to the guide rail 210, and two opposite sides of the push block are provided with a first side push inclined surface 823 and a second side push inclined surface 824. When the pressing member is pushed forward for a specific distance, the elastic clamping block 811 enters the first positioning groove 220, in this case, the first guide inclined surface 221 abuts against the first switch member 710, the lock is switched to the first operating mode. When the pressing member is pushed forward for a specific distance again, the elastic clamping block 811 leaves the first positioning groove 220 along the first guide inclined surface 221 to enter the second positioning groove 230, in this case, the second guide inclined surface 231 abuts against the blocking member 720 to enable the blocking member 720 to move to a position where the first clutch member 410 can be blocked from moving toward the driving member 310, so as to prevent the first clutch member 410 and the driving member 310 from being engaged. When the pressing member is pushed forward for a specific distance again, the elastic clamping block 811 leaves the second positioning groove 230 along the second guide inclined surface 231 to return to the guide rail 210, and the pressing member is connected to a spring member that drives the return movement of the pressing member, so that the pressing member can retreat back to an original position. The first linkage mechanism 800 can also achieve the switching of the operating modes of the lock by using a pressing mode.

Referring to FIGS. 3 and 4, in some embodiments of the present disclosure, the rod member is a strip, the strip is freely rotatable in the through hole 320, the operating member 810 is provided with a first slot 812 for one end of the strip to be inserted, the other end of the strip is provided with a T-shaped anti-disengaging portion 831, the moving member 820 is provided with a second slot 822 matched with the T-shaped anti-disengaging portion 831, and a clamp 840 for driving the T-shaped anti-disengaging portion 831 to be tightly engaged with the second slot 822 is arranged outside the moving member 820. It may be understood that, in general, the operating member 810 and the moving member 820 are made of plastic material, the strip is made of metal material, and one end of the strip is inserted into the first slot 812 to form a tight engaging effect, so as to simplify a connection structure between the operating member 810 and the rod member without screwing or glue for fixing. Since the moving member 820 is located inside the front lock body 100, if the moving member 820 falls off the strip, it will cause the remaining parts inside the front lock body 100 to be locked. The other end of the strip is provided with a T-shaped anti-disengaging portion 831, and the T-shaped anti-disengaging portion 831 extends through the second slot 822 to facilitate the simplification of a connection structure between the moving member 820 and the rod member without screwing or glue for fixing. Moreover, the clamp 840 is configured to drive the T-shaped anti-disengaging portion 831 and the second slot 822 to be tightly engaged with each other, so that the shifting of the moving member 820 relative to the rod member can be prevented.

Referring to FIG. 5, in some embodiments of the present disclosure, the mechanical lock cylinder 500 comprises a lock sleeve and a core body rotatably arranged within the lock sleeve, the core body can be linked with the first clutch member 410 to extend out towards the driving member 310, an sensing part is arranged at a keyhole 510 of the core body, the lock sleeve is movably provided with a pre-ejecting member 520 arranged in parallel with an extending direction of the keyhole 510, the lock further comprises an alarm module, a voice identification module, and a linear driver 530 configured to drive the pre-ejecting member 520 to move in a telescopic way, the alarm module is configured to give an alarm when the sensing part detects a key being arranged in the keyhole 510, the voice identification module, the linear driver 530, the alarm module and the sensing part are all electrically connected to the control module, and the control module controls the telescopic movement of the linear driver 530 and the operating state of the alarm module according to the voice information identified by the voice identification module. It should be noted that, when the lock is in the second operating mode, the electric clutch mechanism 400 cannot be electrically unlocked, in this case, people outside the room can still unlock the lock by using the key, and if people inside the room are engaging in a relatively private behavior, to ensure that this behavior is not disturbed, when the key is inserted into the keyhole 510, the sensing part detects the existence of the key and transmits information to the control module, and the control module controls the linear driver 530 to drive the pre-ejecting member 520 to extend out, so that the key is prevented from being completely inserted into the keyhole 510 to unlock the lock, and meanwhile, the alarm module is started, and people inside the room can approve or refuse people outside the room to use the key to unlock the lock through a voice instruction. Specifically, when the user agrees with the unlocking by the voice instruction, the alarm module is stopped, the linear driver 530 drives the pre-ejecting member 520 to be retracted, and the key can be completely inserted into the keyhole 510, and when the user refuses the unlocking by the voice instruction, the alarm module is stopped, the linear driver 530 drives the pre-ejecting member 520 to be kept extended out, and the key cannot be completely inserted into the keyhole 510. The linear driver 530 may be an electric push rod.

Figure 7:
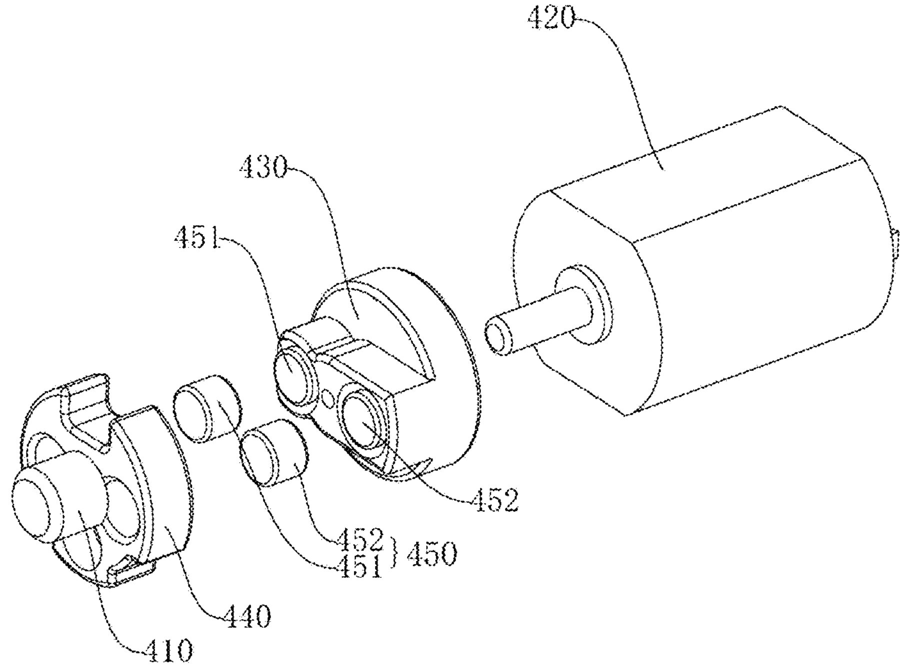
FIG. 7 is a schematic exploded view of an electric clutch mechanism according to an embodiment of the present disclosure.

Referring to FIG. 7, in some embodiments of the present disclosure, the electric clutch mechanism 400 comprises a motor 420 fixedly arranged in the front lock body 100, a rotation block 430 connected to an output shaft of the motor 420, and a moving block 440 that is capable of reciprocating along an extending direction of the output shaft of the motor 420, the second clutch member 600 is a second plug pin arranged on the moving block 440, the driving member 310 is provided with a second plug hole corresponding to the second plug pin, a magnetic component 450 is arranged between the rotation block 430 and the moving block 440, and when the motor 420 drives the rotation block 430 to rotate, the magnetic component 450 drives the moving block 440 close to or away from the rotation block 430, so as to drive the second plug pin to insert into or separate from the second plug hole. Specifically, the rotation block 430 and the moving block 440 are circumferentially provided with a first magnet 451 and a second magnet 452 around the output shaft of the motor 420, the magnetic poles of ends of the first magnet 451 and the second magnet 452 close to each other are opposite, and two first magnets 451 and two second magnets 452 jointly form the magnetic component 450. In this embodiment, on an end surface of the rotation block 430 facing the moving block 440, the magnetic poles of the first magnet 451 and the second magnet 452 on the rotation block 430 are respectively N pole and S pole, on an end surface of the moving block 440 facing the rotation block 430, the magnetic poles of the first magnet 451 and the second magnet 452 on the moving block 440 are respectively N pole and S pole. When the two first magnets 451 are aligned, the two second magnets 452 are also aligned, as a result, a mutual repulsion action is generated, so that the second plug pin on the moving block 440 is inserted into the second plug hole. When the two first magnets 451 are respectively aligned with the two second magnets 452, an attractive interaction is generated, so that the second plug pin on the moving block 440 is separated from the second plug hole.

The electric clutch mechanism 400 has the advantages of a simple and ingenious structure, quick action response, and low noise.

Figure 8:
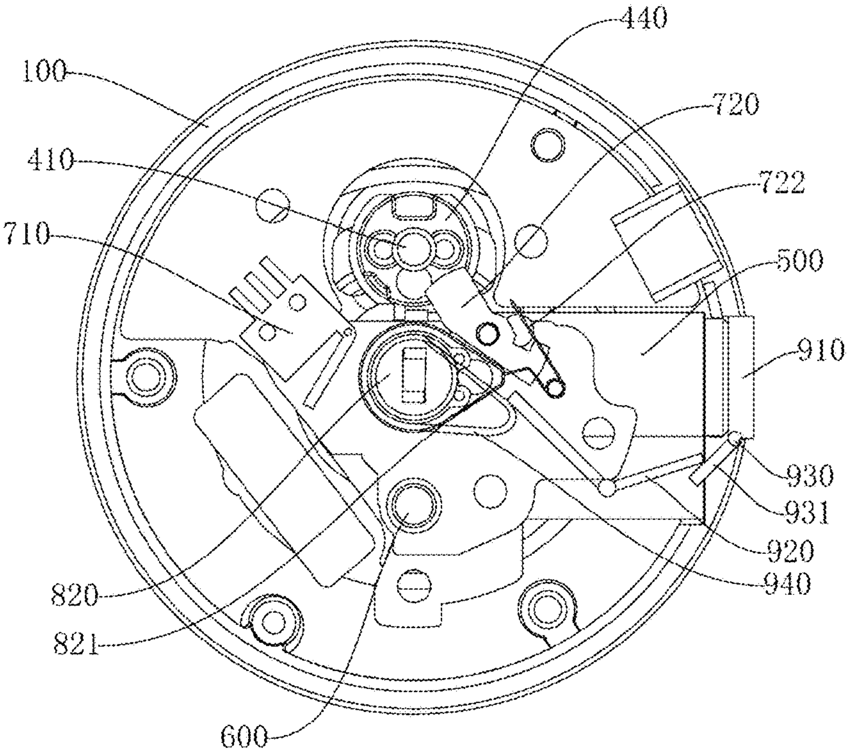
FIG. 8 is a structural schematic diagram showing interior of the front lock body according to another embodiment of the present disclosure.

Referring to FIG. 8, in some embodiments of the present disclosure, the front lock body 100 is movably provided with a cover plate 910 capable of closing the keyhole 510, the cover plate 910 is coupled to the moving member 820 through a second linkage mechanism 920, the lock further has a third operating mode, the moving member 820 has a third operating position corresponding to the third operating mode, and the moving member 820 in the third operating position is capable of driving the blocking member 720 to move so as to prevent the first clutch member 410 and the driving member 310 from being engaged and is capable of driving the cover plate 910 to keep closing the keyhole 510. It may be understood that when the operating member 810 controls the moving member 820 to move to the third operating position, the moving member 820 not only can drive the blocking member 720 to prevent the first clutch member 410 and the driving member 310 from being engaged, but also can be linked with the cover plate 910 through the second linkage mechanism 920 to keep closing the keyhole 510, thereby meeting the requirement of higher privacy.

Referring to FIG. 8, in some embodiments of the present disclosure, the cover plate 910 is rotatably arranged on the front lock body 100 through a second pivot 930, the second pivot 930 is provided with a second elastic member, the second elastic member is configured to drive the cover plate 910 to open the keyhole 510, the second pivot 930 is provided with a side extension portion 931 protruding out along a radial direction of the second pivot, the second linkage mechanism 920 comprises a lever rotatably arranged inside the front lock body 100, one end of the lever corresponds to the moving member 820, and the other end of the lever is capable of pushing the side extension portion 931 to rotate the second pivot 930, so as to drive the cover plate 910 to keep closing the keyhole 510. Specifically, the moving member 820 is further provided with a second eccentric portion 940, the second eccentric portion 940 and the first eccentric portion 821 are arranged at an interval along a length direction of the rod member. When the operating member 810 drives the rod member and the moving member 820 to rotate together to enable the moving member 820 to be located at the third operating position, the first eccentric portion 821 drives the blocking member 720 to move to abut against the moving block 440, so that the first clutch member 410 is prevented from being engaged with the driving member. Meanwhile, the second eccentric portion 940 can shift one end of the lever, so that the other end of the lever shifts the side extension portion 931, and the second pivot 930 on the cover plate 910 is further driven to rotate, so that the cover plate 910 is kept closing the keyhole 510. The keyhole 510 can be closed by linkage of the cover plate 910 while the moving member 820 rotates to switch the operating modes of the lock, so that there is no need to additionally arrange a structure of locking the cover plate 910, and abundant functions can be achieved by a simple structure. Of course, when rescue is needed, the lock can be unlocked by a key by destroying the cover plate 910, or the door can be opened by destroying the door.

Technical features in the above embodiments may be combined in any combinations. To make the description brief, not all possible combinations of various technical features in the above embodiments are described. However, it should be considered as being within the scope of the specification as long as there is no contradiction in the combinations of the technical features.

Although the embodiments of the present disclosure have been shown and described, it may be understood by those having ordinary skills in the art that various changes, modifications, substitutions, and alterations may be made to these embodiments without departing from the principle and purpose of the present disclosure, and the scope of the present disclosure is defined in the claims and equivalents thereof.

What is claimed is:

1. A lock with multiple switchable operating modes, having a first operating mode and a second operating mode, and comprising:

a front lock body;

a rear lock body;

a connecting rod, wherein one end of the connecting rod is connected to the rear lock body, and the other end of the connecting rod is fixedly connected to a driving member extending into the front lock body;

an electric clutch mechanism arranged on the front lock body, wherein the electric clutch mechanism has a first clutch member that is capable of being engaged with or separated from the driving member;

a mechanical lock cylinder arranged on the front lock body, wherein the mechanical lock cylinder has a second clutch member that is capable of being engaged with or separated from the driving member;

an identification module arranged on the front lock body and electrically connected to the electric clutch mechanism;

a first switch member arranged on the front lock body;

a blocking member movably arranged on the front lock body;

a first linkage mechanism, wherein the first linkage mechanism comprises an operating member arranged on the rear lock body, a moving member arranged on the front lock body, and a linkage member arranged between the operating member and the moving member, the moving member has a first operating position and a second operating position, the operating member is capable of driving the moving member to switch between the first operating position and the second operating position through the linkage member, the moving member located at the first operating position is capable of triggering the first switch member, so that the first switch member generates a trigger signal, and the moving member located at the second operating position is capable of driving the blocking member to move so as to prevent the first clutch member and the driving member from being engaged to enable the lock to be switched to the second operating mode; and a control module, wherein the control module is electrically connected to the identification module, the electric clutch mechanism and the first switch member, and is configured to control the lock to be switched to the first operating mode according to the trigger signal;

wherein the front lock body is movably provided with a cover plate capable of closing a keyhole of the mechanical lock cylinder, the cover plate is coupled to the moving member through a second linkage mechanism, the lock further has a third operating mode, the moving member has a third operating position corresponding to the third operating mode; and wherein the linkage member is a rod member, the moving member is further provided with a second eccentric portion, the second eccentric portion and a first eccentric portion of the moving member are arranged at an interval along a length direction of the rod member; when the operating member drives the rod member and the moving member to rotate together to enable the moving member to be located at the third operating position, the first eccentric portion drives the blocking member to move to abut against a moving block of the electric clutch mechanism, so that the first clutch member is prevented from being engaged with the driving member, the second eccentric portion is capable of shifting one end of a lever of the second linkage mechanism, so that the other end of the lever drives a second pivot of the cover plate to rotate and the cover plate is kept closing the keyhole.

2. The lock with multiple switchable operating modes according to claim 1, wherein when the lock is in the first operating mode, the identification module is capable of triggering, by receiving an administrator password, the control module to drive the first clutch member and the driving member to be engaged; and when the lock is in the second operating mode, the second clutch member is capable of being engaged with the driving member only by inserting a key into the mechanical lock cylinder by a user.

3. The lock with multiple switchable operating modes according to claim 1, wherein a through hole is formed in the connecting rod and extends through the connecting rod along a length direction of the connecting rod, the linkage member is a rod member that extends through the through hole, the operating member is connected to one end of the rod member close to the rear lock body and protruding out of an outer surface of the rear lock body, the moving member is connected to one end of the rod member close to the front lock body and protruding out of the driving member, the moving member has a first eccentric portion that protrudes out along a side portion of the rod member, and the operating member is capable of driving the rod member and the moving member to rotate together around a first axis relative to the connecting rod, so that the first eccentric portion contacts the first switch member or the blocking member.

4. The lock with multiple switchable operating modes according to claim 3, wherein the blocking member is rotatably arranged on the front lock body through a first pivot, one end of the blocking member corresponds to the moving member, the other end of the blocking member is rotatable to abut against the first clutch member to prevent the first clutch member and the driving member from being engaged, the blocking member is connected to a first elastic member, and the first elastic member drives the blocking member away from the first clutch member to enable the first clutch member to be engaged with the driving member.

5. The lock with multiple switchable operating modes according to claim 4, wherein the rod member is a strip, the strip is freely rotatable in the through hole, the operating member is provided with a first slot for one end of the strip to be inserted, the other end of the strip is provided with a T-shaped anti-disengaging portion, the moving member is provided with a second slot matched with the T-shaped anti-disengaging portion, and a clamp for driving the T-shaped anti-disengaging portion to be tightly engaged with the second slot is arranged outside the moving member.

6. The lock with multiple switchable operating modes according to claim 1, wherein the mechanical lock cylinder comprises a lock sleeve and a core body rotatably arranged within the lock sleeve, the core body is linked with the first clutch member to extend out towards the driving member, an sensing part is arranged at a keyhole of the core body, the lock sleeve is movably provided with a pre-ejecting member arranged in parallel with an extending direction of the keyhole, the lock further comprises an alarm module, a voice identification module, and a linear driver configured to drive the pre-ejecting member to move in a telescopic way, the alarm module is configured to give an alarm when the sensing part detects a key being arranged in the keyhole, the voice identification module, the linear driver, the alarm module and the sensing part are all electrically connected to the control module, and the control module controls telescopic movement of the linear driver and operating state of the alarm module according to voice information identified by the voice identification module.

7. The lock with multiple switchable operating modes according to claim 1, wherein a through hole is formed in the connecting rod and extends through the connecting rod along a length direction of the connecting rod, the linkage member is a rod member that extends through the through hole, the operating member is a pressing member that is connected to one end of the rod member, the moving member is a push block that is connected to the other end of the rod member, a pressing and positioning structure is provided between the pressing member and the rear lock body, the pressing and positioning structure comprises an elastic clamping block arranged on the pressing member, a guide rail is arranged in the rear lock body and is configured to allow the elastic clamping block to rotate, the guide rail is provided with a first positioning groove and a second positioning groove at an interval in a pressing direction of the pressing member, the first positioning groove has a first guide inclined surface for guiding the elastic clamping block to leave the first positioning groove to enter the second positioning groove, the second positioning groove has a second guide inclined surface for guiding the elastic clamping block to leave the second positioning groove to return to the guide rail, and a first side push inclined surface corresponding to the first switch member and a second side push inclined surface corresponding to the blocking member are arranged on two opposite sides of the push block.

8. The lock with multiple switchable operating modes according to claim 1, wherein the electric clutch mechanism comprises a motor fixedly arranged in the front lock body, a rotation block connected to an output shaft of the motor, and a moving block that is capable of reciprocating along an extending direction of the output shaft of the motor, the second clutch member is a second plug pin arranged on the moving block, the driving member is provided with a second plug hole corresponding to the second plug pin, a magnetic component is arranged between the rotation block and the moving block, and when the motor drives the rotation block to rotate, the magnetic component drives the moving block close to or away from the rotation block, so as to drive the second plug pin to insert into or separate from the second plug hole.

9. The lock with multiple switchable operating modes according to claim 1, wherein the cover plate is rotatably arranged on the front lock body through a second pivot, the second pivot is provided with a second elastic member, the second elastic member is configured to drive the cover plate to open the keyhole, the second pivot is provided with a side extension portion protruding out along a radial direction of the second pivot, the second linkage mechanism comprises a lever rotatably arranged inside the front lock body, one end of the lever corresponds to the moving member, and the other end of the lever is capable of pushing the side extension portion to rotate the second pivot, so as to drive the cover plate to keep closing the keyhole.

* * * * *